United States Patent
Mizutani

(10) Patent No.: US 8,829,422 B2
(45) Date of Patent: Sep. 9, 2014

(54) OPTICAL SCANNING APPARATUS USING MEMS MIRROR AND IMAGE FORMING APPARATUS PROVIDED WITH THE SAME

(75) Inventor: Hideji Mizutani, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 898 days.

(21) Appl. No.: 12/913,380

(22) Filed: Oct. 27, 2010

(65) Prior Publication Data

US 2011/0101202 A1   May 5, 2011

(30) Foreign Application Priority Data

Oct. 30, 2009 (JP) ................................ 2009-250319
Oct. 30, 2009 (JP) ................................ 2009-250605

(51) Int. Cl.
| | | |
|---|---|---|
| H01J 3/14 | (2006.01) | |
| G06M 7/00 | (2006.01) | |
| G02B 26/10 | (2006.01) | |
| G02B 26/08 | (2006.01) | |

(52) U.S. Cl.
CPC .......... *G02B 26/0841* (2013.01); *G02B 26/101* (2013.01)
USPC ......................................... 250/235; 250/221

(58) Field of Classification Search
CPC ....... H04N 1/113; H04N 1/1135; H04N 1/04; H04N 1/12; H04N 1/053; H04N 1/047; H04N 1/0473; H04N 2201/047; H04N 2201/04701; H04N 2201/0471; H04N 2201/04729; H04N 2201/04731; G02B 26/10; G02B 27/0031
USPC ................. 347/233, 235–237, 246, 247, 250; 250/221, 216, 234–236; 359/196.1, 359/197.1, 199.1–199.4, 200.6–200.8, 359/201.1, 201.2, 202.1, 203.1, 212.2, 359/213.1, 216.1–219.1, 223.1, 226.1; 358/474, 482, 489, 494
See application file for complete search history.

(56) References Cited

U.S. PATENT DOCUMENTS 7,491,919 B2 * 2/2009 Skurnik et al. ............. 250/208.1
8,363,297 B2    1/2013 Soeda et al.
(Continued)

FOREIGN PATENT DOCUMENTS

| JP | 63-121013 | 5/1988 |
|---|---|---|
| JP | 1-100509 | 4/1989 |

(Continued)

OTHER PUBLICATIONS

Japanese Office Action mailed Sep. 26, 2012.

(Continued)

*Primary Examiner* — Pascal M Bui Pho
(74) *Attorney, Agent, or Firm* — Dilworth & Barrese, LLP.

(57) ABSTRACT

An optical scanning apparatus including: a MEMS mirror that deflects an optical beam output from a light source; a drive unit that drives the MEMS mirror at a constant cycle; and a photodetector device that detects the optical beam output from the light source, a deflection state of the MEMS mirror is obtained from a relationship between a phase of a drive phase signal input to the drive unit and a phase of a detection signal of the photodetector device. For example, time T is detected between output of the drive phase signal and output of the detection signal from the photodetector device, and maximum deflection angle $\theta_m$ of the MEMS mirror is obtained by the equation $\theta_m = \theta_0 / \sin(2\pi vT - \pi/2)$. T is time, $\theta_0$ is an installation deflection angle of the photodetector device, and $v$ is a deflection frequency of the MEMS mirror.

6 Claims, 10 Drawing Sheets

(56) References Cited

U.S. PATENT DOCUMENTS

| | | |
|---|---|---|
| 2003/0021497 A1 | 1/2003 | Kandori et al. |
| 2008/0273230 A1* | 11/2008 | Kadowaki ............... 359/199 |
| 2009/0153933 A1* | 6/2009 | Tsuchiya et al. ......... 359/204.1 |
| 2009/0225383 A1 | 9/2009 | Soeda et al. |
| 2009/0255383 A1* | 10/2009 | Hsieh ..................... 81/451 |
| 2011/0025813 A1* | 2/2011 | Suzuki et al. ............ 347/224 |

FOREIGN PATENT DOCUMENTS

| | | |
|---|---|---|
| JP | 3-134613 | 6/1991 |
| JP | 2924200 | 7/1999 |
| JP | 2003131151 | 5/2003 |
| JP | 2004-029064 | 1/2004 |
| JP | 2004-29064 | 1/2004 |
| JP | 2005-195689 | 7/2005 |
| JP | 2006-47590 | 2/2006 |
| JP | 2007-86626 | 4/2007 |
| JP | 2008275757 | 11/2008 |
| JP | 2009-31671 | 2/2009 |
| JP | 2009-145515 | 7/2009 |
| JP | 2009-216744 | 9/2009 |

OTHER PUBLICATIONS

Japanese Office Action mailed May 22, 2013.

* cited by examiner

OPTICAL SCANNING APPARATUS USING MEMS MIRROR AND IMAGE FORMING APPARATUS PROVIDED WITH THE SAME

This application is based upon and claims the benefit of priority from the corresponding Japanese Patent Applications Nos. 2009-250319 filed on 30 Oct. 2009 and 2009-250605 filed on 30 Oct. 2009, the entire content of which are incorporated herein by reference.

BACKGROUND OF THE INVENTION

1. Field of the Invention

The present invention is related to an optical scanning apparatus using a MEMS mirror as a deflection means and an image forming apparatus such as a copy machine and a printer provided with the optical scanning apparatus.

2. Related Art

In an image forming apparatus such as a copy machine and a printer, a surface of an image carrying body is uniformly charged by a charging device, the image carrying body is exposed and scanned by an optical scanning apparatus, and an electrostatic latent image is formed on the surface of the image carrying body corresponding to image information. Thereafter, the electrostatic latent image is developed by a developing device using a toner as a developer, and visualized as a toner image. The toner image is transferred onto paper by a transfer device, and then heated, pressurized and fixed onto the paper by a fixing device. Ejection of the paper onto which the toner image is fixed terminates a series of image forming operations.

In an optical scanning apparatus, a polygon mirror and a galvano mirror have been mainly used conventionally as a deflector for scanning an optical beam. However, in order to achieve higher resolution image and higher speed printing, it is required to rotate the polygon mirror and the galvano mirror at higher speed.

Since high speed rotation of the polygon mirror and the galvano mirror may produce problems related to bearing durability, and heat and noise due to windage (energy loss due to air resistance during rotation), there is limit in the speeding up of scanning.

Given this, in recent years, a deflector using silicon micromachining technology (Micro Electro Mechanical Systems, MEMS) is being developed. For example, a method is proposed in which a micro mirror (hereinafter referred to as MEMS mirror) and a torsion beam for pivotally supporting thereof are integrally formed on a Si substrate and AC voltage is applied between a movable electrode on a MEMS mirror side and a fixed electrode on a fixed side, thereby torsioning the torsion beam by an electrostatic attractive force between the electrodes and oscillating the MEMS mirror using resonance (for example, see Japanese Unexamined Patent Application Publication No. H04-211218).

According to the abovementioned method, due to oscillation (sinusoidal vibration) of the MEMS mirror using resonance, the effects of providing high-speed movement and suppressing noise and power consumption can be obtained. On the other hand, the MEMS mirror has a smaller deflection angle than that of the polygon mirror and size of reflection surface of the MEMS mirror is limited.

However, the MEMS mirrors using resonance of Si substrate have different deflection angles due to variable inherent resonance frequency. In addition, deflection angle characteristics thereof vary according to change in temperature and barometric pressure, and thus scanning performance such as linearity varies according to environmental variation. Therefore, a technology for compensating the deflection angle is required that, in a case in which a maximum deflection angle of a MEMS mirror is smaller than a predetermined value, approximates the deflection angle to the predetermined angle by increasing voltage supplied to an electrode of the MEMS mirror. In addition, a technology for monitoring the maximum deflection angle, or a scanning speed, which is an equivalent parameter.

Regarding the technology for monitoring the maximum deflection angle or the scanning speed of MEMS mirror, for example, Japanese Unexamined Patent Application Publication No. H1-100509 proposes a technology of measuring time interval between two signals generated when a resonance scanner goes back and force above a scanning position sensor disposed outside a scanned region and controlling drive voltage of the resonance scanner such that the time interval becomes equal to a predetermined value.

In addition, Japanese Unexamined Patent Application Publication No. H3-134613 proposes a technology of controlling a torsion angle of a reflection mirror according to a detection result of a temperature detection means. Japanese Unexamined Patent Application Publication No. 2004-029064 proposes a technology of measuring induced current generated in an internal coil of a MEMS mirror and monitoring a deflection state of the MEMS mirror based on a result thereof. Furthermore, Japanese Unexamined Patent Application Publication No. 2006-047590 proposes a technology of calculating a scanning speed based on an interval between detection signals from detectors provided in the vicinity of both end portion of a scanning range of an optical beam.

An MEMS mirror changes in deflection angle characteristics according to change in temperature and barometric pressure. Therefore, in a case of using such a MEMS mirror in an optical scanning apparatus for an image forming apparatus, scanning performance such as linearity varies according to environmental variation.

In addition, if a driving frequency is not approximate to a resonance frequency (natural frequency) of the MEMS mirror, the maximum deflection angle of the MEMS mirror is greatly decreased. Therefore, the driving frequency must be set to a value that is approximate to the resonance frequency of the MEMS mirror.

However, MEMS mirrors have variable resonance frequencies (natural frequencies) due to minute differences in manufacture. As a result, if the MEMS mirrors are driven at the same driving frequency, the respective maximum deflection angles thereof are different. In other words, the MEMS mirrors with different maximum deflection angles provide variable scanning performance. Such a MEMS mirror used in a scanning apparatus for an image forming apparatus causes a problem of deteriorated image.

Given this, for example, Japanese Unexamined Patent Application Publication No. H1-100509 proposes a technology of measuring time interval between two signals generated when a resonance scanner goes back and force above a scanning position sensor disposed outside a scanned region and controlling drive voltage of the resonance scanner such that the time interval becomes equal to a predetermined value.

In addition Japanese Unexamined Patent Application Publication No. 2009-031671 proposes a technology of reducing image deterioration such as jitter by modulating a clock that determines timing of blinking of a light source. Japanese Unexamined Patent Application Publication No. 2005-195869 proposes a technology of compensating the maximum deflection angle of a MEMS mirror to be a uniform value by changing a driving frequency. Japanese Unexamined Patent Application Publication No. 2007-086626 proposes a technology of, when an interval between detection signals output from a photodetector device is changed due to change in a torsion angle of a MEMS mirror, compensating the torsion angle of the MEMS mirror to be uniform by adjusting applied voltage to the MEMS mirror based on the change of the interval.

SUMMARY OF THE INVENTION

However, the techniques proposed in Japanese Patent Application Publications Nos. H1-100509, H3-134613, 2004-029064, and 2006-047590 have a problem of complex configuration and control leading to a higher cost.

More specifically, the technique proposed in Japanese Patent Application Publication No. H1-100509 requires a high-accuracy and expensive scanning position sensor for scanning in both directions. The technique proposed in Japanese Patent Application Publication No. H3-134613 requires a temperature measurement of extremely high accuracy for calculating a deflection state of a reflection mirror from a temperature.

In addition, the technique proposed in Japanese Patent Application Publication No. 2004-029064 requires a complex control for detecting a weak induced current. In the technique proposed in Japanese Patent Application Publication No. 2006-047590, a large-sized and complex apparatus is indispensable for photodetection in two sites.

Furthermore, Japanese Patent Application Publications Nos. H1-100509, 2009-031671, 2005-195869, and 2007-086626 do not mention compensation accuracy of the maximum deflection angle of a MEMS mirror. More specifically, an image is deteriorated only with a change of 0.005° in the maximum deflection angle of the MEMS mirror. A change in the maximum deflection angle of the MEMS mirror due to deviation between the resonance frequency and the driving frequency of the MEMS mirror may exceed 10°. For example, in order to compensate the change in the maximum deflection angle with a voltage, a variable range of almost 100 V is necessary with a resolution of a few mV. To realize this, a complex and expensive drive circuit is necessary. Even by limiting the variable range of voltage by selecting a MEMS mirror with a resonance frequency, there are problems of a decreased yield rate and an increased cost of the MEMS mirror.

The present invention has been made in view of the abovementioned problems and primarily aims at providing an optical scanning apparatus that can monitor a deflection state of a MEMS mirror with a high degree of accuracy in an inexpensive configuration and an image forming apparatus provided therewith.

The present invention has been made in view of the abovementioned problems and secondarily aims at providing an optical scanning apparatus that can compensate a deflection state of a MEMS mirror with a high degree of accuracy in an inexpensive configuration and an image forming apparatus provided therewith.

In order to achieve the abovementioned objectives, in a first aspect of the present invention, an optical scanning apparatus comprises: a MEMS mirror that deflects an optical beam output from a light source; a drive unit that drives the MEMS mirror at a constant cycle; and a photodetector device that detects the optical beam output from the light source, wherein a deflection state of the MEMS mirror is obtained from a relationship between a phase of a drive phase signal input to the drive unit and a phase of a detection signal of the photodetector device.

In order to achieve the abovementioned objectives, in a second aspect of the present invention, an optical scanning apparatus comprises: a MEMS mirror that deflects an optical beam output from a light source; a drive unit that drives the MEMS mirror at a constant cycle; and a drive control unit that controls the drive unit, wherein the drive control unit includes: a first control portion that coarsely adjusts the maximum deflection angle of the MEMS mirror by variance control of any one of amplitude and waveform of a drive control signal thereof while maintaining a basic cycle of a drive signal of the drive control unit; and a second control portion that performs fine adjustment of the maximum deflection angle of the MEMS mirror by variance control of the other of amplitude and waveform of the drive control signal while maintaining the basic cycle of the drive signal of the drive control unit.

A phase of a detection signal of a photodetector device, which detects an optical beam deflected by a MEMS mirror, is changed according to a change in deflection angle characteristics of the MEMS mirror, while a phase of a drive phase signal, which is input to a drive unit, is constant. The change in the phase of the detection signal and the deflection angle characteristics of the MEMS mirror are correlative.

As a result, according to the present invention, by obtaining the deflection state of the MEMS mirror from a relationship between the phase of the drive phase signal input to the drive unit and the phase of a detection signal of the photodetector device, the deflection state of the MEMS mirror can be monitored with a high degree of accuracy in an inexpensive configuration.

In addition, according to the present invention, the maximum deflection angle of the MEMS mirror can be coarsely adjusted by variance control of amplitude of a drive control signal by a first control portion of a drive control unit, followed by fine adjustment of the maximum deflection angle of the MEMS mirror by variance control of waveform of the drive control signal by a second control portion of the drive control unit. As a result, the present invention can compensate a deflection state of a MEMS mirror with a high degree of accuracy in an inexpensive configuration.

Incidentally, a phase of a detection signal of a photodetector device, which detects an optical beam deflected by a MEMS mirror, is changed according to a change in deflection angle characteristics of the MEMS mirror, while a phase of a drive control signal, which is input to a drive unit, is constant. The change in the phase of the detection signal and the deflection angle characteristics of the MEMS mirror are correlative.

Accordingly, variation in deflection angle characteristics of a MEMS mirror due to environmental variation and the like can be compensated by: obtaining a deflection state of the MEMS mirror from a relationship between a phase of a drive phase signal input to the drive unit and a phase of a detection signal of a photodetector device; coarsely adjusting the maximum deflection angle of the MEMS mirror by variance control of amplitude of a drive control signal by a first control portion of the drive control unit; and finely adjusting the maximum deflection angle of the MEMS mirror by variance control of waveform (pulse width) of the drive control signal by a second control portion.

DETAILED DESCRIPTION OF THE INVENTION

Embodiments of the present invention are described hereinafter with reference to the attached drawings.

[Image Forming Apparatus]

Figure 1:
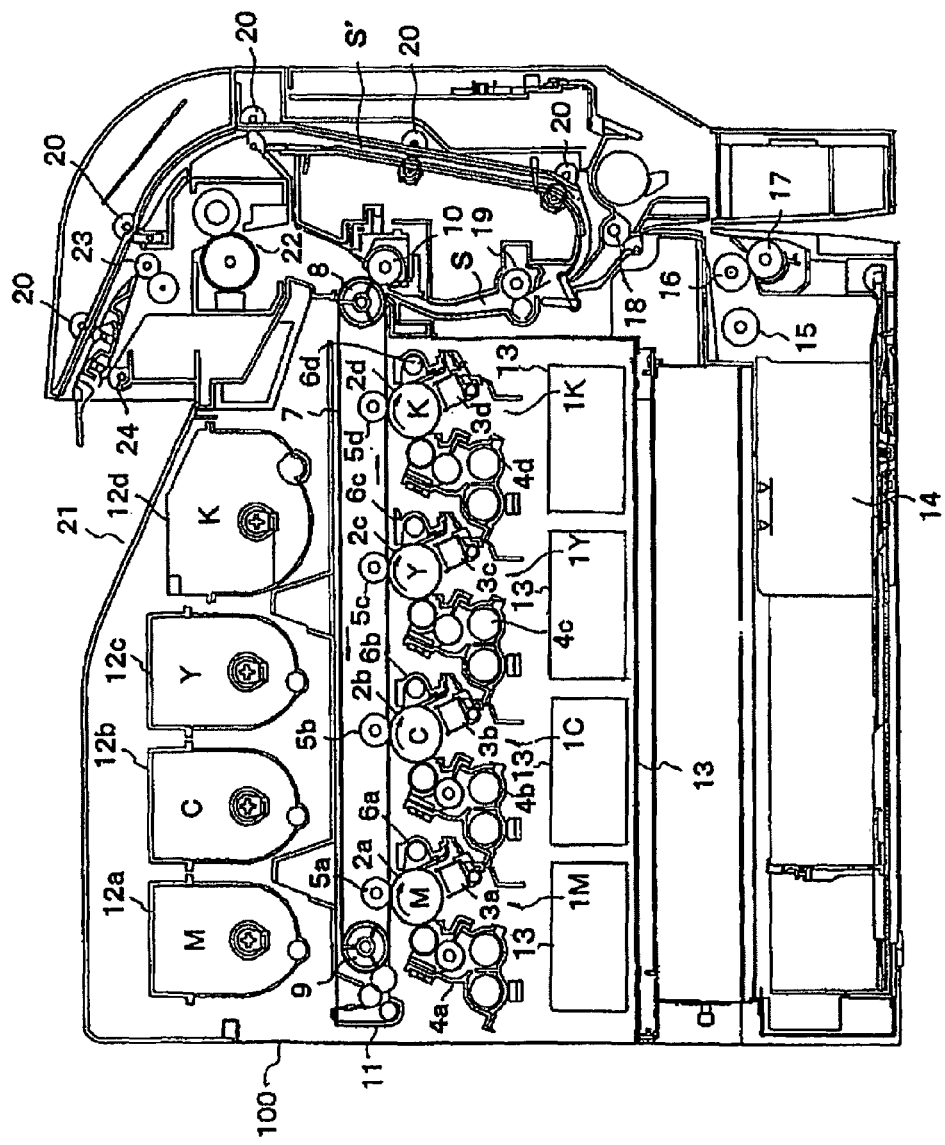
FIG. 1 is a cross-sectional side view of an image forming apparatus (color laser printer) according to a first embodiment of the present invention.

FIG. 1 is a cross-sectional view of a color laser printer as a first embodiment of an image forming apparatus according to the present invention. The color laser printer shown is of a tandem system. In a central portion inside a main body 100 of the color laser printer, a magenta image forming unit 1M, a cyan image forming unit 1C, a yellow image forming unit 1Y, and a black image forming unit 1K are arranged in tandem at constant intervals.

In the abovementioned image forming units 1M, 1C, 1Y and 1K, photoreceptor drums 2a, 2b, 2c, and 2d, which are image carrying body, are respectively disposed. In a periphery of each of the photoreceptor drums 2a, 2b, 2c and 2d, charging devices 3a, 3b, 3c and 3d, developing devices 4a, 4b, 4c and 4d, transfer rollers 5a, 5b, 5c and 5d, and drum cleaning devices 6a, 6b, 6c and 6d are respectively disposed.

Here, the abovementioned photoreceptor drums 2a, 2b, 2c and 2d are drum-shaped photoreceptors that are rotationally driven at a predetermined processing speed in a direction of an arrow shown (clockwise direction) by a drive motor (not shown). The charging devices 3a, 3b, 3c and 3d uniformly charge surfaces of the photoreceptor drums 2a, 2b, 2c and 2d at a predetermined potential by a charging bias applied from a charging bias supply (not shown).

The developing devices 4a, 4b, 4c and 4d respectively store toners of magenta (M), cyan (C), yellow (Y) and black (K). The developing devices 4a, 4b, 4c and 4d each deposit toner of each color on an electrostatic latent image formed on each of the photoreceptor drums 2a, 2b, 2c and 2d, thereby visualizing the electrostatic latent image as a toner images of each color.

The transfer rollers 5a, 5b, 5c and 5d are disposed so as to be contactable to the photoreceptor drums 2a, 2b, 2c and 2d respectively in each primary transfer unit, via an intermediate transfer belt 7. The intermediate transfer belt 7 is disposed to be stretched between a drive roller 8 and a tension roller 9, so as to run on an upper face side of each of the photoreceptor drums 2a, 2b, 2c and 2d. The drive roller 8 is disposed to be contactable to a secondary transfer roller 10 via the intermediate transfer belt 7 in a secondary transfer unit. In addition, a belt cleaning device 11 is provided in the vicinity of the tension roller 9.

Above each of the image forming units 1M, 1C, 1Y and 1K inside the printer main body 100, toner containers 12a, 12b, 12c and 12d for supplying toner to the developing devices 4a, 4b, 4c and 4d are disposed to be aligned.

In addition, below each of the image forming units 1M, 1C, 1Y and 1K inside the printer main body 100, four optical scanning apparatuses 13 according to the present invention are disposed to correspond to the image forming units 1M, 1C, 1Y and 1K. In a bottom portion of the printer main body 100, below the four optical scanning apparatuses 13, a paper feeding cassette 14 is detachably disposed. A plurality of sheets of paper (not shown) is stacked and stored in the paper feeding cassette 14. In the vicinity of the paper feeding cassette 14, a pick-up roller 15 for picking up the paper from the paper feeding cassette 14, a feeding roller 16 and a retarding roller 17 for separating the paper thus picked up and feeding the paper to a paper path S sheet by sheet are provided.

In the paper path S extending in a vertical direction on a side portion of the printer main body 100, a conveyance roller pair 18 for conveying the paper and a resist roller pair 19 for temporarily retaining and supplying the paper to the secondary transfer unit at a predetermined timing are provided. The secondary transfer unit is where a secondary transfer opposing roller 8 and the secondary transfer roller 10 contact each other. Beside the paper path S, another paper path S' used for duplex printing is formed. In the paper path S', a plurality of reversing roller pairs 20 is provided at appropriate intervals.

The paper path S, which is disposed in the vertical direction on a side portion inside the printer main body 100, extends toward an ejected paper tray 21 provided on an upper face of the printer main body 100. In the middle of the paper path S, a fixing device 22 and paper ejection roller pairs 23 and 24 are provided.

An image forming operation by the color laser printer thus configured is hereinafter described.

When an image forming start signal is generated, in each of the image forming units 1M, 1C, 1Y and 1K, each of the photoreceptor drums 2a, 2b, 2c and 2d are rotationally driven at a predetermined processing speed in the direction of the arrow shown (clockwise direction). The photoreceptor drums 2a, 2b, 2c and 2d are uniformly charged by the charging devices 3a, 3b, 3c and 3d. Each optical scanning apparatus 13 outputs an optical beam that is modulated by a color image signal of each color, irradiates a surface of each of the photoreceptor drums 2a, 2b, 2c and 2d with the optical beam, and forms an electrostatic latent image corresponding to the color image signal of each color on each of the photoreceptor drums 2a, 2b, 2c and 2d.

Thereafter, first, a magenta toner is deposited on the electrostatic latent image formed on the photoreceptor drum 2a of the magenta image forming unit 1M, by the developing device 4a to which a developing bias of the same polarity as a charged polarity of the photoreceptor drum 2a is applied. The electrostatic latent image is thus visualized as a magenta toner image. In the primary transfer unit (transfer nip portion) between the photoreceptor drum 2a and the transfer roller 5a, the magenta toner image is primarily transferred onto the intermediate transfer belt 7 rotationally driven in the direction of the arrow shown, by an effect of the transfer roller 5a to which a primary transfer bias of an opposite polarity to that of the toner is applied.

The intermediate transfer belt 7, to which the magenta toner image is thus primarily transferred, is moved to the cyan image forming unit 1C. In the cyan image forming unit 1C, as in the abovementioned procedure, a cyan toner image formed on the photoreceptor drum 2b is transferred to overlap the magenta toner image on the intermediate transfer belt 7 in the primary transfer unit.

Similarly, in each primary transfer unit, yellow and black toner images formed on the photoreceptor drums 2c and 2d of the yellow and black image forming units 1Y and 1K are sequentially transferred to overlap the magenta and cyan toner images transferred and superimposed on the intermediate transfer belt 7. A full-color toner image is thus formed on the intermediate transfer belt 7.

Residual toner that is not transferred to the intermediate transfer belt 7 and remains on the photoreceptor drums 2a, 2b, 2c and 2d is removed by the drum cleaning devices 6a, 6b, 6c and 6d. The photoreceptor drums 2a, 2b, 2c and 2d are thus prepared for the next image formation.

Thereafter, when a front end of the full-color toner image on the intermediate transfer belt 7 reaches the secondary transfer unit (transfer nip portion) between the drive roller 8 and the secondary transfer roller 10, the paper is fed from the paper feeding cassette 14 into the paper path S by the pick-up roller 15, the feeding roller 16 and the retarding roller 17. The paper fed into the paper path S is conveyed to the secondary transfer unit by the resist roller pair 19. Afterwards, the full-color toner image is secondarily transferred collectively from the intermediate transfer belt 7 onto the paper conveyed to the secondary transfer unit, by the secondary transfer roller 10 to which a secondary transfer bias of an opposite polarity to that of the toner is applied.

The paper onto which the full-color toner image is transferred is then conveyed to the fixing device 22. The full-color toner image is heat-fixed onto a surface of the paper by heating and pressurizing. The paper onto which the toner image is fixed is ejected to the ejected paper tray 21 by the paper ejection roller pairs 23 and 24. A series of image forming operations is thus completed.

Residual toner that is not transferred to the paper and remains on the intermediate transfer belt 7 is removed by the belt cleaning device 11. The intermediate transfer belt 7 is thus prepared for the next image formation.

[Optical Scanning Apparatus]

The optical scanning apparatus 13 according to the first embodiment of the present invention is described hereinafter with reference to FIGS. 2 to 4. It should be noted that, since the four optical scanning apparatuses 13 have the same configuration, one of the optical scanning apparatuses 13 is described hereinafter.

Figure 2:
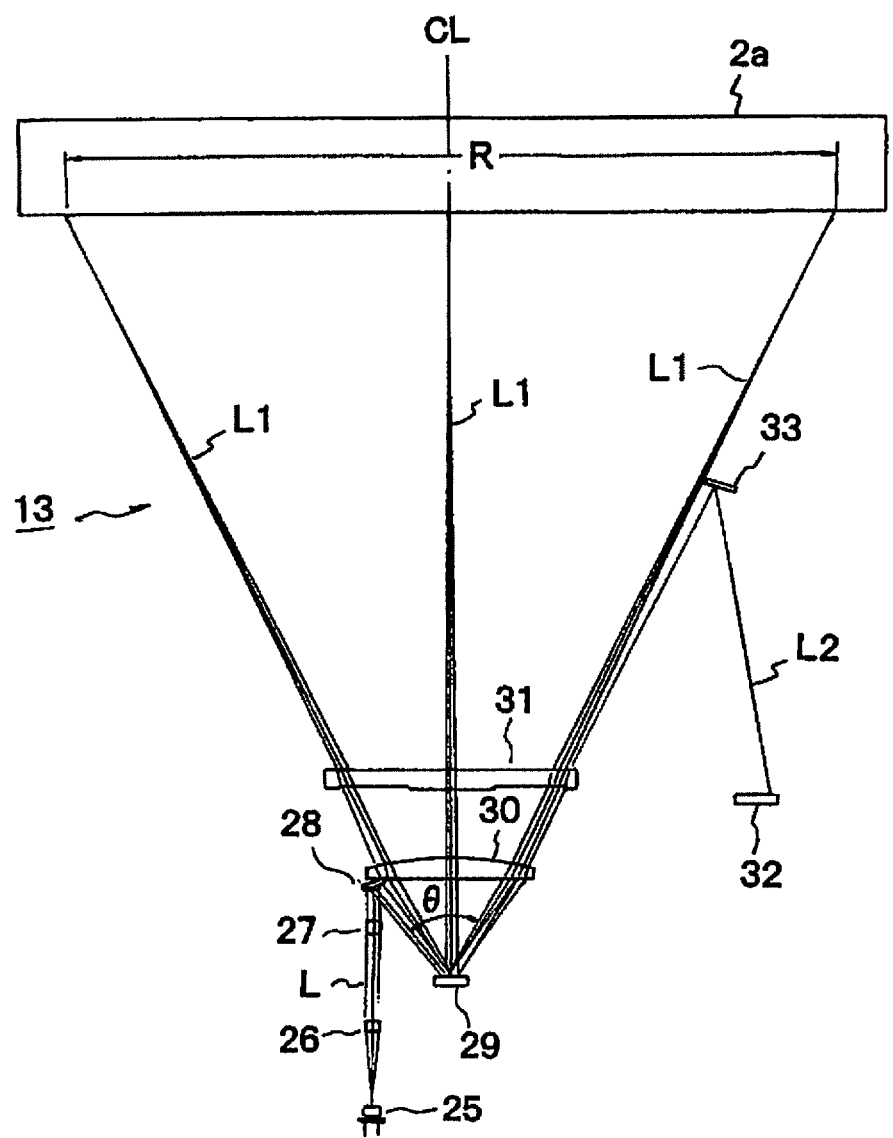
FIG. 2 is a plan view showing a configuration of a main section of an optical scanning apparatus according to a first embodiment of the present invention.

FIG. 2 is a plan view showing a configuration of a main section of the optical scanning apparatus according to the first embodiment of the present invention. FIG. 3 is a front view of a deflection element of the optical scanning apparatus. FIG. 4 is a cross-sectional view taken along a line A-A of FIG. 3.

As shown in FIG. 2, the optical scanning apparatus 13 is provided with a laser light source (laser diode) 25. Along an output direction of an optical beam L from the laser light source 25, a collimator lens 26, a cylindrical lens 27 and a reflection mirror 28 are disposed linearly. On a scanning center CL, a deflection element 29 is disposed. In a traveling direction of an optical beam L1 that is deflected by the deflection element 29, scanning lenses 30 and 31 are disposed respectively. In addition, a BD sensor 32 and a BD mirror 33 are disposed on a side (on a right side in FIG. 2) opposite to the side on which the laser light source 25, the collimator lens 26, the cylindrical lens 27 and the like are disposed, across the scanning center CL, at a position outside of a valid scanning range (a scanning range actually used as a printing width) R of the optical beam L1. The BD mirror 33 reflects and guides the optical beam L2, which is deflected by the deflection element 29 and travels in a light path outside of the valid scanning range R, to the BD sensor 32.

A configuration and operation of the deflection element 29 are described hereinafter with reference to FIGS. 3 and 4.

The deflection element 29 is composed by, on a Si substrate 35 joined onto a frame 34, integrally forming a MEMS mirror 36 in an elongated oval shape and a torsion beam 37 for supporting thereof by a micromachining technology (MEMS technology) for etching, film forming and the like. The MEMS mirror 36 oscillates around the torsion beam 37 (sinusoidal vibration).

Figure 3:
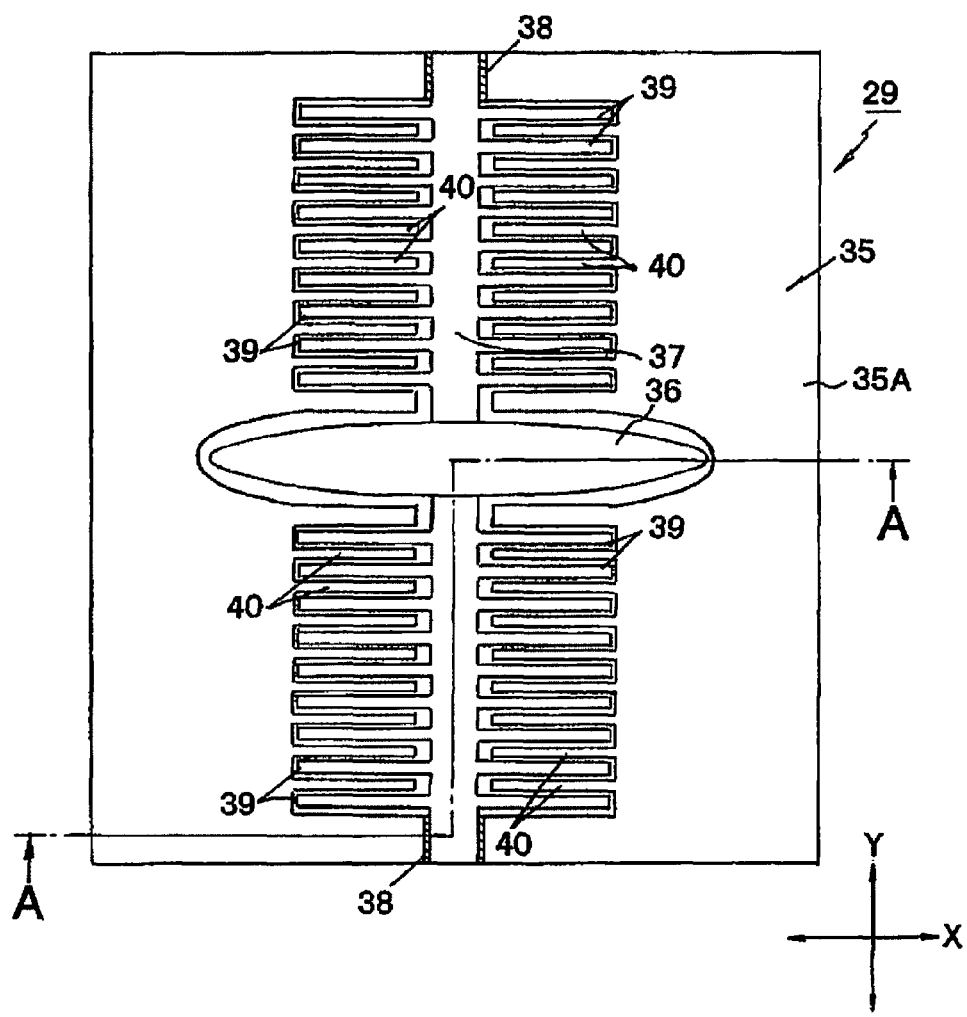
FIG. 3 is a front view of a deflection element of the optical scanning apparatus according to the first embodiment of the present invention.

As shown in FIG. 3, both ends in a longitudinal direction (X axis direction) of the torsion beam 37 are electrically insulated by an insulation portion 38. On both sides in a width direction of the torsion beam 37, a plurality of comb-shaped movable electrodes 39 extending in a direction orthogonal to the longitudinal direction (Y axis direction) are formed. On a side to a main body 35A of the Si substrate 35, a plurality of fixed electrodes 40, which is to be positioned between the movable electrodes 39, is formed. The movable electrodes 39 and the fixed electrodes 40 are disposed alternately along the longitudinal direction (X axis direction) of the torsion beam 37.

Figure 4:
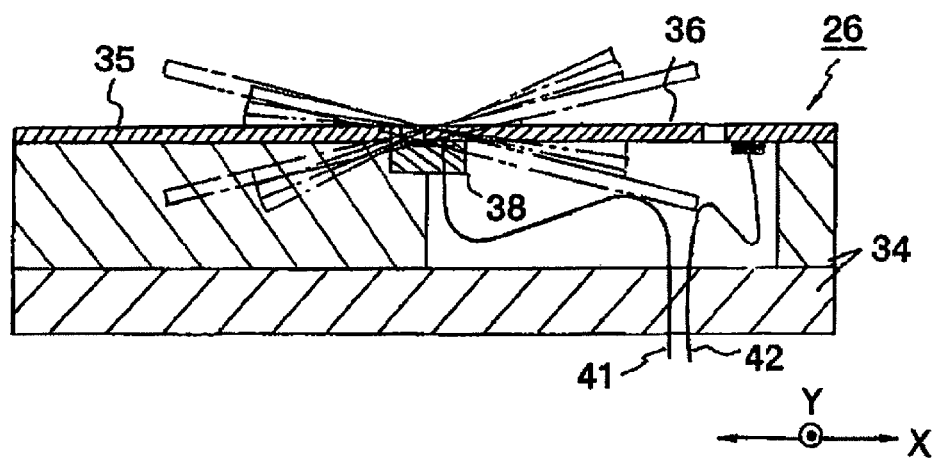
FIG. 4 is a cross-sectional view taken along a line A-A of FIG. 3.

As shown in FIG. 4, electrical wires 41 and 42 from an AC power source are connected to the movable electrodes 39 and the fixed electrodes 40.

In the deflection element thus configured, when an alternating voltage from the AC power source is applied to the movable electrodes 39 and the fixed electrodes 40 via the electrical wires 41 and 42 respectively, an electrostatic attractive force is generated between the movable electrodes 39 and the fixed electrodes 40. The MEMS mirror 36 oscillates by a predetermined angle (deflection angle) around the torsion beam 37 (X axis), as shown by a dashed-dotted line in FIG. 4, by the electrostatic attractive force. A driving frequency of the MEMS mirror 36 is set to be a resonance frequency. Amplitude (deflection angle) of the MEMS mirror 36 is thus increased. In addition, an aluminum film and the like are formed on a surface (reflective surface) of the MEMS mirror 36. Reflectivity of the surface of the MEMS mirror 36 is thus increased.

Afterwards, in the optical scanning apparatus 13 shown in FIG. 2, upon an ON/OFF control of the laser light source 25 according to image data, the optical beam L that is modulated according to the image data is output from the laser light source 25. The optical beam L is shaped into collimated light of an appropriate size by the collimator lens 26, and incident upon the cylindrical lens 27 having power only in a sub-scanning direction (Y axis direction).

The optical beam L having passed through the cylindrical lens 27 is reflected by the reflection mirror 28, incident upon the MEMS mirror 36 of the deflection element 29 (see FIG. 3), and forms an image.

The optical beam L incident upon the MEMS mirror 36 of the deflection element 29 is deflected in a main scanning direction (X axis direction) by oscillation of the MEMS mirror as described above. The optical beam L1 thus deflected passes through the scanning lenses 30 and 31 and forms an image on the photoreceptor drum 2a (2b, 2c, 2d) of each image forming unit 1M (1C, 1Y, 1K) shown in FIG. 1. The optical beam L1 thus deflected exposes and scans on the photoreceptor drum 2a (2b, 2c, 2d) in the main scanning direction (in a direction of the arrow shown).

Here, the optical beam L2 is reflected by the BD mirror 33 and incident upon the BD sensor 32 disposed outside the valid scanning range R. By detecting the optical beam L2 by the BD sensor 32, starting timing of exposure and scanning (writing) on the photoreceptor drum 2a (2b, 2c, 2d) by the optical beam L1 is determined.

Next, a principle of monitoring a deflection state of the MEMS mirror 36 in the optical scanning apparatus 13 according to the first embodiment of the present invention is described with reference to FIG. 5.

Figure 5:
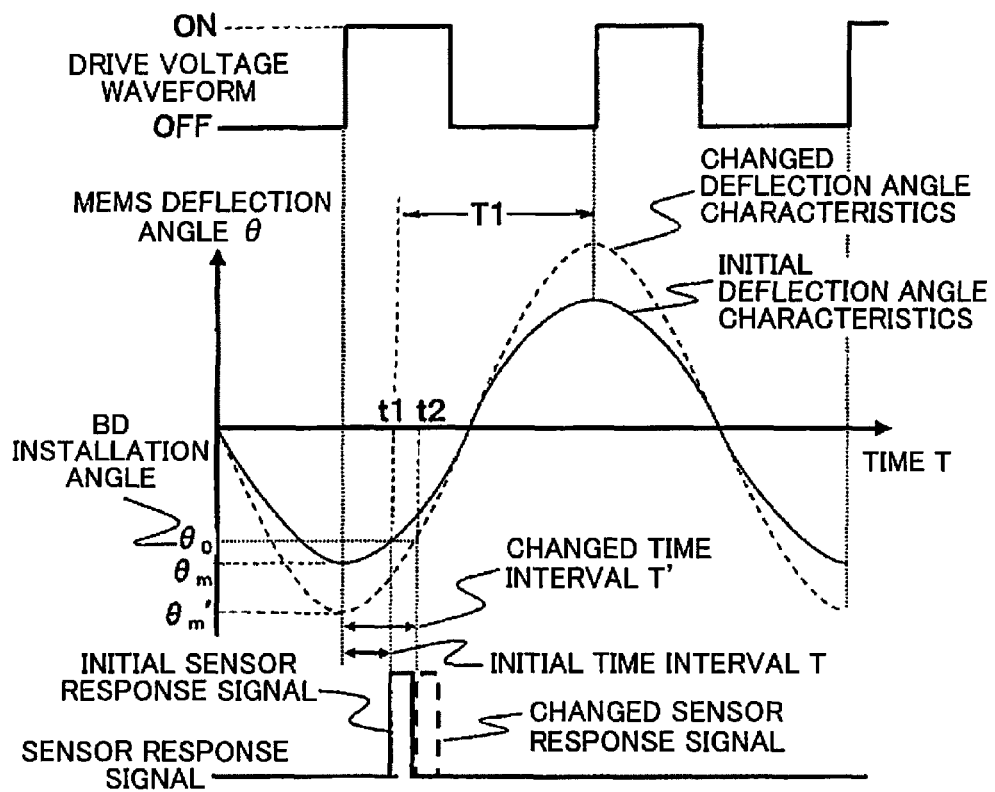
FIG. 5 is a diagram for explaining a principle of monitoring a deflection state of a MEMS mirror in the optical scanning apparatus according to the first embodiment of the present invention, showing a time change of a voltage drive signal, a deflection angle of the MEMS mirror, and a sensor answer signal.

FIG. 5 is a diagram showing a time change of a voltage drive signal, a deflection angle of the MEMS mirror 36, and a sensor answer signal output from the BD sensor 32. The drive voltage (alternating voltage) waveform (drive voltage waveform) that drives the MEMS mirror 36 of the deflection element 29 (applied from an AC power source to the movable electrodes 39 and the fixed electrodes 40 shown in FIG. 3) is square-wave.

The MEMS mirror 36 oscillates. Accordingly, the deflection angle characteristics thereof is in sinusoidal wave as shown in the drawing, and frequency of the drive voltage is twice as high as the deflection angle characteristics of the MEMS mirror 36. It should be noted that, in FIG. 5, the drive voltage is turned on when an absolute value of the deflection angle θ of the MEMS mirror 36 is the greatest, in other words when a degree of torsion of the MEMS mirror 36 is the greatest, for simplicity. However, a moment where the degree of torsion of the MEMS mirror 36 is the greatest and a moment where the drive voltage is turned on may be slightly different according to Duty ratio and the like of the drive voltage.

The deflection angle characteristics of the MEMS mirror 36 shown by a solid line in FIG. 5 is in an initial state. In a case where the deflection angle characteristics changes as shown by a broken line due to an environmental variation, frequency of the drive voltage does not change. Therefore, frequency of the deflection angle characteristics of the MEMS mirror 36 does not change and the maximum deflection angle $\theta_m$, which is amplitude, changes to $\theta_m'$ ($>\theta_m$). Here, since the phase of the deflection angle characteristics are not different before and after the variation of the deflection angle characteristics of the MEMS mirror 36, a phase relationship between the drive voltage and the deflection angle characteristics does not change.

On the other hand, a deflection angle $\theta_0$ of the MEMS mirror 36 when the BD sensor 32 detects the optical beam L2 (installation deflection angle) is stable. Accordingly, when the deflection angle characteristics of the MEMS mirror 36 is in an initial state as shown by a solid line in FIG. 4, at a time t1 shown in the drawing, the BD sensor 32 detects the optical beam L2 and outputs an answer signal (initial sensor answer signal) shown by a solid line in FIG. 4.

Thereafter, when the deflection angle characteristics of the MEMS mirror 36 changes as shown by a broken line, at a time t2 (>t1) shown in the drawing, the BD sensor 32 detects the optical beam L2 and outputs an answer signal (initial sensor answer signal) shown by a broken line in FIG. 4.

As described above, the drive voltage and the deflection angle characteristics of the MEMS mirror 36 are maintained unchanged even with the environmental variation. On the other hand, a phase between the deflection angle characteristics of the MEMS mirror 36 (the maximum deflection angle $\theta_m$) and the answer signal of the BD sensor 32 is changed. The change in the phase of the answer signal and the deflection angle characteristics of the MEMS mirror 36 are correlative.

As a result, by obtaining the deflection state of the MEMS mirror 36 from a relationship between the phase of the drive phase signal input to the drive unit and the phase of the answer signal of the BD sensor 32, the deflection state of the MEMS mirror 36 can be monitored with a high degree of accuracy in an inexpensive configuration according to the first embodiment.

More specifically, the maximum deflection angle $\theta_m$ of the MEMS mirror 36, in a state where the deflection angle characteristics of the MEMS mirror 36 is in an initial state shown by the solid line in FIG. 4, can be obtained by the following equation, where T is time between turning on of the drive phase signal and output of the answer signal from the BD sensor 32, $\theta_0$ is an installation deflection angle (stable) of the BD sensor 32, and ν is a deflection frequency (stable) of the MEMS mirror 36.

$$\theta_m = \theta_0/\sin(2\pi\nu T - \pi/2) \qquad (1)$$

In addition, the maximum deflection angle $\theta_m'$ of the MEMS mirror 36, in a state where the deflection angle characteristics of the MEMS mirror 36 changes as shown by the broken line in FIG. 4, can be obtained by the following equation, where T' is time between turning on of the drive phase signal and output of the answer signal from the BD sensor 32.

$$\theta_m' = \theta_0/\sin(2\pi\nu T' - \pi/2) \qquad (2)$$

For example, by methods such as drive control, temperature control, and modulation control of an LD lighting reference clock, the maximum deflection angle $\theta_m'$ obtained by Equation 2 can be approximated to the maximum deflection angle $\theta_m$ obtained by Equation 1 (initial value), thereby compensating the variation in the deflection angle characteristics of the MEMS mirror 36 due to environmental variations and the like. As a result, the deflection angle characteristics of the MEMS mirror 36, changed as shown by the broken line in FIG. 4, can be restored to the initial deflection angle characteristics shown by the solid line.

It should be noted that, in the abovementioned first embodiment, the deflection state of the MEMS mirror 36 is obtained by detecting time T between output of the drive phase signal and output of the detection signal from the BD sensor 32; however, the present invention is not limited thereto. For example, the deflection state of the MEMS mirror 36 can also be obtained by detecting time T1 (see FIG. 5) between output of the detection signal from the BD sensor 32 and output of a following drive phase signal.

Next, a second embodiment of the present invention is described. Regarding the second embodiment, a difference from the first embodiment is mainly described and similar components to the first embodiment are referred to by the same numerals and specific descriptions thereof are omitted.

Descriptions in the first embodiment apply to components that are not explained in the second embodiment.

In the second embodiment, the MEMS mirror 36 is driven at a constant cycle by a drive unit (AC power source), which is controlled by a drive control unit. The drive control unit includes: a first control portion that coarsely adjusts the maximum deflection angle of the MEMS mirror 36 by variance control of amplitude of the drive control signal while maintaining a basic cycle of a drive signal of the drive control unit; and a second control portion that finely adjusts the maximum deflection angle of the MEMS mirror 36 by variance control of waveform of the drive control signal. A variation of the maximum deflection angle of the MEMS mirror 36 due to an environmental variation is compensated by the drive control unit in the method shown in FIGS. 6 to 9.

In other words, FIGS. 6 to 9 are diagrams showing relationships between the drive control signal and the deflection angle characteristics of the MEMS mirror, in an initial state, after an environmental variation, after a voltage correction, and after a duty correction, respectively. The drive voltage (alternating voltage) waveform (drive voltage waveform) that drives the MEMS mirror 36 of the deflection element 29 (applied from an AC power source to the movable electrodes 39 and the fixed electrodes 40 shown in FIG. 3) is square-wave.

In addition, since the MEMS mirror 36 oscillates, the deflection angle characteristics thereof is in sinusoidal wave as shown in the drawings, and frequency of the drive voltage is twice as high as the deflection angle characteristics of the MEMS mirror 36. It should be noted that, in FIGS. 6 to 9, the drive voltage is turned on when an absolute value of the deflection angle θ of the MEMS mirror 36 is the greatest, in other words when a degree of torsion of the MEMS mirror 36 is the greatest, for simplicity. However, a moment where the degree of torsion of the MEMS mirror 36 is the greatest and a moment where the drive voltage is turned on may be slightly different according to Duty ratio and the like of the drive voltage.

Figure 6:
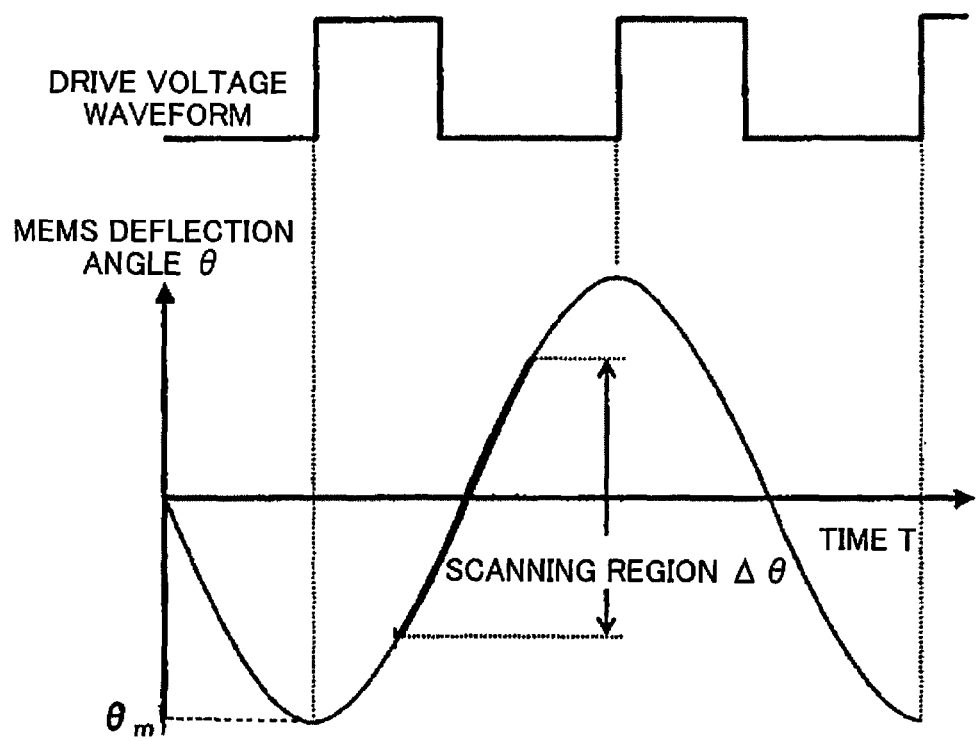
FIG. 6 is a diagram showing a relationship between a drive control signal and deflection angle characteristics of a MEMS mirror in an initial state in an optical scanning apparatus according to a second embodiment of the present invention.

The deflection angle characteristics of the MEMS mirror 36 shown by a solid line in FIG. 6 is in an initial state. In the initial state, the maximum deflection angle of the MEMS mirror 36 is $\theta_m$ as shown in the drawing, and a scanning range (corresponding to the deflection angle) is a region $\alpha\theta$ shown in the drawing. In the region $\Delta\theta$, the photoreceptor drum 2a (2b, 2c, 2d) is exposed and scanned.

Figure 7:
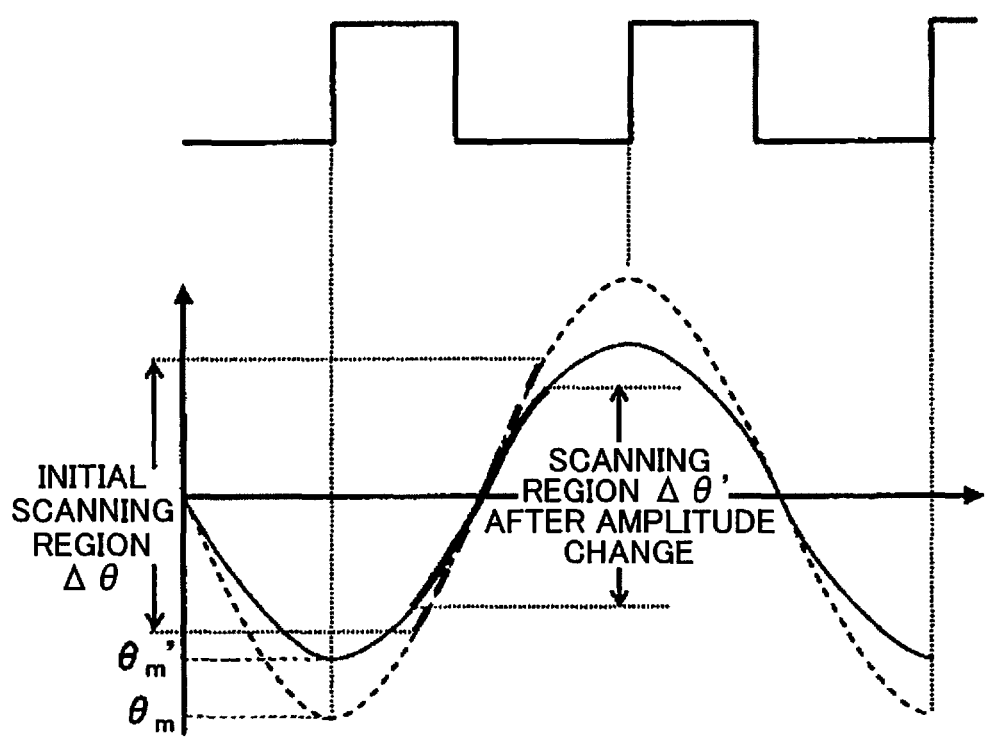
FIG. 7 is a diagram showing a relationship between the drive control signal and the deflection angle characteristics of the MEMS mirror after an environmental variation in the optical scanning apparatus according to the second embodiment of the present invention.

In a case where the deflection angle characteristics of the MEMS mirror 36 changes from an initial state shown by a broken like in FIG. 7 (shown by a solid line in FIG. 6) to a state shown by a solid line in FIG. 7 due to an environmental variation, the maximum deflection angle of the MEMS mirror 36 decreases to $\theta_m'$ ($\theta_m' < \theta_m$) shown in the drawing, despite the drive voltage being unchanged. As a result, the scanning range becomes $\Delta\theta'$, which is narrower than an initial scanning range $\Delta\theta$ shown in FIG. 6 ($\Delta\theta' < \Delta\theta$).

Figure 8:
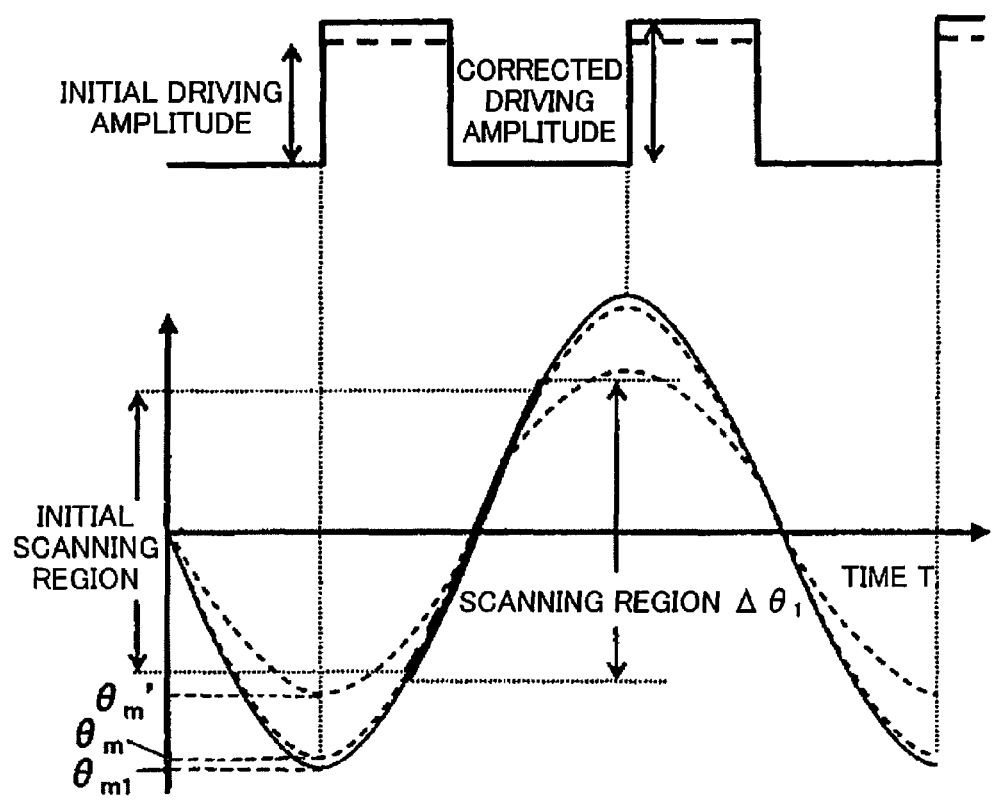
FIG. 8 is a diagram showing a relationship between the drive control signal and the deflection angle characteristics of the MEMS mirror after a voltage correction in the optical scanning apparatus according to the second embodiment of the present invention.

In such a case, the first control portion of the drive control unit increases amplitude of the drive control signal as shown in FIG. 8 from an initial value shown by a broken line to a value shown by a solid line, while maintaining a basic cycle of the drive signal. As a result, the deflection angle characteristics of the MEMS mirror 36 changes as shown by a solid line and the maximum deflection angle is coarsely adjusted to $\theta_{m1}$. According to this, the scanning range $\Delta\theta_1$ widens as shown in the drawing. In this case, since a minimum variation unit of oscillation amplitude of the drive control signal is large, the deflection angle characteristics of the MEMS mirror 36 does not overlap the initial deflection angle characteristics shown by a broken line in FIG. 8, and thus the scanning range $\Delta\theta_1$ is slightly different from the initial scanning range $\Delta\theta$.

Figure 9:
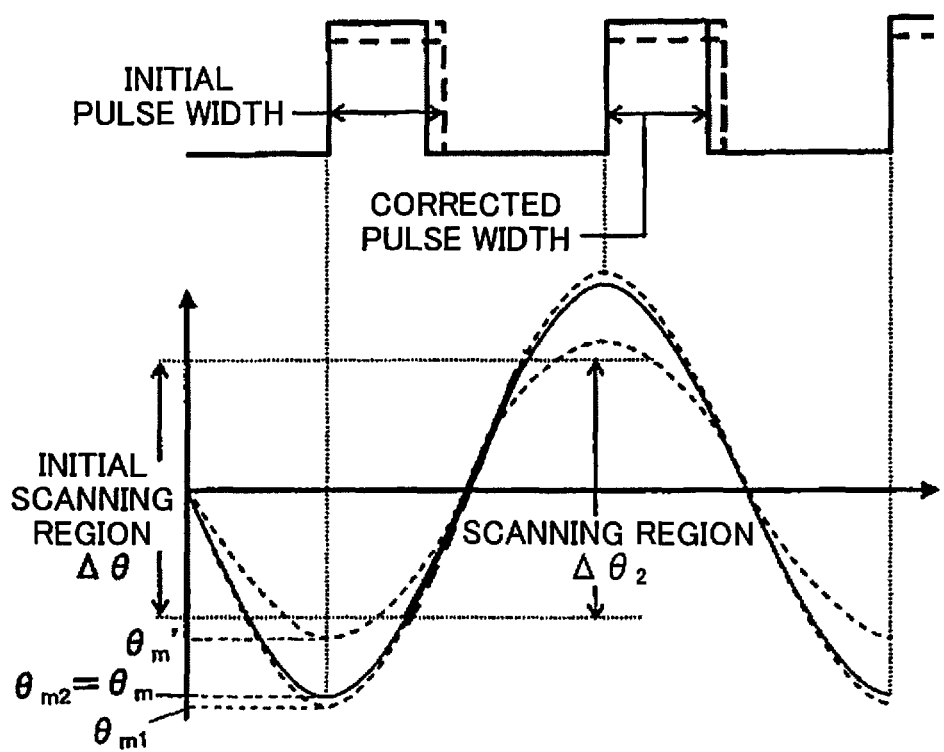
FIG. 9 is a diagram showing a relationship between the drive control signal and the deflection angle characteristics of the MEMS mirror after a duty correction in the optical scanning apparatus according to the second embodiment of the present invention.

Given this, the second control portion finely adjusts the maximum deflection angle of the MEMS mirror 36 by variance control of waveform of the drive control signal. More specifically, as shown in FIG. 9, an active period of the drive control signal of square-wave, in other words a pulse width, is reduced from a value shown by a broken line to a value shown by a solid line. The pulse width is thus adjusted by changing Duty ratio of the square-wave voltage signal.

After the abovementioned fine adjustment of the maximum deflection angle of the MEMS mirror 36, the deflection angle characteristics of the MEMS mirror 36 changes from a state shown by a broken line in FIG. 9 and overlaps the initial deflection angle characteristics shown by a solid line. The maximum deflection angle $\theta_{m2}$ overlaps the initial maximum deflection angle $\theta_{m2}$. Concurrently ($\theta_{m2} = \theta_m$), the scanning range $\Delta\theta_2$ also overlaps the initial scanning range $\Delta\theta(\Delta\theta_2 = \Delta\theta)$.

As described above, in the second embodiment, the maximum deflection angle of the MEMS mirror 36 can be coarsely adjusted by variance control of amplitude of a drive control signal by a first control portion of a drive control unit, followed by fine adjustment of the maximum deflection angle of the MEMS mirror 36 by variance control of waveform (pulse width) of the drive control signal by a second control portion of the drive control unit. As a result, according to the second embodiment, a deflection state of a MEMS mirror can be compensated with a high degree of accuracy in an inexpensive configuration.

Next, a principle of monitoring a deflection state of the MEMS mirror 36 in the optical scanning apparatus according to the second embodiment of the present invention is described with reference to FIG. 9.

Figure 10:
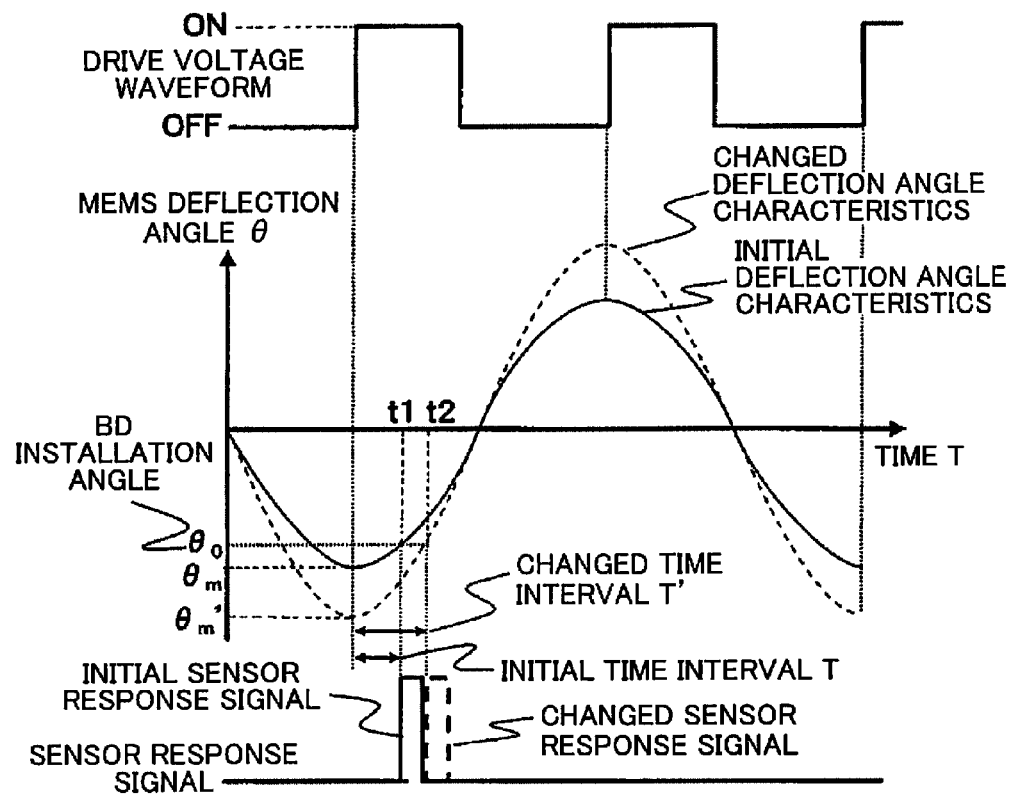
FIG. 10 is a diagram for explaining a principle of monitoring a deflection state of a MEMS mirror in the optical scanning apparatus according to the second embodiment of the present invention, showing a time change of a voltage drive signal, a deflection angle of the MEMS mirror, and a sensor answer signal.

FIG. 10 is a diagram showing a time change of a voltage drive signal, a deflection angle of the MEMS mirror, and a sensor answer signal. The deflection angle characteristics of the MEMS mirror 36 shown by a solid line in FIG. 10 is in an initial state. In a case where the deflection angle characteristics change as shown by a broken line due to an environmental variation, frequency of the drive voltage does not change. Therefore, frequency of the deflection angle characteristics of the MEMS mirror 36 does not change and the maximum deflection angle $\theta_m$, which is amplitude, changes to $\theta_m'(>\theta_m)$. Here, since the phase of the deflection angle characteristics are not different before and after the variation of the deflection angle characteristics of the MEMS mirror 36, a phase relationship between the drive voltage and the deflection angle characteristics does not change.

On the other hand, a deflection angle $\theta_0$ of the MEMS mirror 36 when the BD sensor 32 detects the optical beam L2 (installation deflection angle) is stable. Accordingly, when the deflection angle characteristics of the MEMS mirror 36 is in an initial state as shown by a solid line in FIG. 4, at a time t1 shown in the drawing, the BD sensor 32 detects the optical beam L2 and outputs an answer signal (initial sensor answer signal) shown by a solid line in FIG. 4.

Thereafter, when the deflection angle characteristics of the MEMS mirror 36 changes as shown by a broken line, at a time t2 (>t1) shown in the drawing, the BD sensor 32 detects the optical beam L2 and outputs an answer signal (initial sensor answer signal) shown by a broken line in FIG. 4.

As described above, the drive voltage and the deflection angle characteristics of the MEMS mirror 36 are maintained unchanged even with the environmental variation. On the other hand, a phase between the deflection angle characteristics of the MEMS mirror 36 (the maximum deflection angle $\theta_m$) and the answer signal of the BD sensor 32 is changed. The change in the phase of the answer signal and the deflection angle characteristics of the MEMS mirror 36 are correlative.

As a result, by obtaining the deflection state of the MEMS mirror 36 from a relationship between the phase of the drive phase signal input to the drive unit and the phase of the answer signal of the BD sensor, the deflection state of the MEMS mirror 36 can be monitored with a high degree of accuracy in an inexpensive configuration.

More specifically, the maximum deflection angle $\theta_m$ of the MEMS mirror 36, in a state where the deflection angle characteristics of the MEMS mirror 36 is in an initial state shown by the solid line in FIG. 4, can be obtained by the following equation, where T is time between turning on of the drive phase signal and output of the answer signal from the BD sensor 32, $\theta_0$ is an installation deflection angle (stable) of the BD sensor 32, and $\nu$ is a deflection frequency (stable) of the MEMS mirror 36.

$$\theta_m = \theta_0 / \sin(2\pi\nu T - \pi/2) \qquad (1)$$

In addition, the maximum deflection angle $\theta_m'$ of the MEMS mirror 36, in a state where the deflection angle characteristics of the MEMS mirror 36 changes according to environmental variation as shown by the broken line in FIG. 4, can be obtained by the following equation, where T' is time between turning on of the drive phase signal and output of the answer signal from the BD sensor 32.

$$\theta_m' = \theta_0 / \sin(2\pi\nu T' - \pi/2) \qquad (2)$$

Accordingly, variation in deflection angle characteristics of a MEMS mirror 36 due to environmental variation and the like can be compensated by: coarsely adjusting the maximum deflection angle of the MEMS mirror 36 by variance control of amplitude of a drive control signal by a first control portion of the drive control unit; finely adjusting the maximum deflection angle of the MEMS mirror 36 by variance control of waveform (pulse width) of the drive control signal by a second control portion; and approximating the maximum deflection angle $\theta_m'$ obtained by Equation 2 to the maximum deflection angle $\theta_m$ obtained by Equation 1 (initial value).

It should be noted that, the abovementioned second embodiment is configured such that the maximum deflection angle of the MEMS mirror is coarsely adjusted by variance control of amplitude of a drive control signal by a first control portion of a drive control unit, followed by fine adjustment of the maximum deflection angle of the MEMS mirror by variance control of waveform of the drive control signal by a second control portion of the drive control unit; however, the present invention is not limited thereto. For example, on the contrary, the present invention can also be configured such that the maximum deflection angle of the MEMS mirror is coarsely adjusted by variance control of waveform of the drive control signal by a first control portion of a drive control unit, followed by fine adjustment of the maximum deflection angle of the MEMS mirror by variance control of amplitude of a drive control signal by a second control portion of the drive control unit, thus providing the same effect.

The embodiments have been described above in which the present invention is applied to a color laser printer and an optical scanning apparatus provided therein; however, the present invention is not limited thereto. The present invention can be similarly applied to other arbitrary image forming apparatuses including a monochrome printer and a copy machine, and an optical scanning apparatus provided therein.

What is claimed is:

1. An optical scanning apparatus comprising:
a MEMS mirror that deflects an optical beam output from a light source;
a drive unit that drives the MEMS mirror at a constant cycle; and
a photodetector device that detects the optical beam output from the light source,
wherein time between turning-on of a drive phase signal and an output of a detection signal from the photodetector device is detected, and
a maximum deflection angle $\theta_m$ of the MEMS mirror is obtained by the following equation: $\theta_m = \theta_0 / \sin(2\pi\nu T - \pi/2)$, where T is the time, $\theta_0$ is an installation deflection angle of the photodetector device, and $\nu$ is a deflection frequency of the MEMS mirror.

2. The optical scanning apparatus according to claim 1, wherein the drive phase signal is a square-wave voltage signal.

3. An image forming apparatus comprising the optical scanning apparatus according to claim 1.

4. An optical scanning apparatus comprising:
a MEMS mirror that deflects an optical beam output from a light source;
a drive unit that drives the MEMS mirror at a constant cycle;
a drive control unit that controls the drive unit; and
a photodetector device that detects the optical beam output from the light source,
wherein the drive control unit includes:
a first control portion that coarsely adjusts a maximum deflection angle of the MEMS mirror by variance control of any one of amplitude and waveform of a drive control signal thereof while maintaining a basic cycle of a drive signal of the drive control unit; and
a second control portion that performs fine adjustment of the maximum deflection angle of the MEMS mirror by variance control of the other of amplitude and waveform of the drive control signal while maintaining the basic cycle of the drive signal of the drive control unit, and
wherein time between turning-on of a drive phase signal and an output of a detection signal from the photodetector device is detected, and
the maximum deflection angle $\theta_m$ of the MEMS mirror is obtained by the following equation: $\theta_m = \theta_0 / \sin(2\pi\nu T - \pi/2)$, where T is the time $\theta_0$ is an installation deflection angle of the photodetector device, and $\nu$ is a deflection frequency of the MEMS mirror.

5. The optical scanning apparatus according to claim 4, wherein: the drive signal of the drive control unit is a square-wave voltage signal; and
one of the first control portion and the second control portion changes a duty ratio of the square-wave voltage signal.

6. An image forming apparatus comprising the optical scanning apparatus according to claim 4.

* * * * *